UNITED STATES PATENT OFFICE.

ERNEST LAREMONT FLEMING, OF CHESTER, ENGLAND.

MANUFACTURE OF BORAX AND BORIC ACID.

1,090,526.  Specification of Letters Patent.  Patented Mar. 17, 1914.

Application filed July 10, 1911. Serial No. 637,762.

*To all whom it may concern:*

Be it known that I, ERNEST LAREMONT FLEMING, a subject of the King of Great Britain, and a resident of Chester, England, have invented certain new and useful Improvements in the Manufacture of Borax and Boric Acid, of which the following is a specification.

Borax is at present largely prepared by boiling, either singly or conjointly, the various naturally occurring borates of lime or double borates of lime and soda together with sesquicarbonate of soda, or an equivalent mixture of sodium mono- and bi-carbonates, in the presence of water. After removal of the precipitated calcium carbonate the liquor containing the borax is set aside or otherwise treated in order to obtain the latter in crystalline form; the borax so obtained being further refined by re-solution in, and recrystallization from, water.

One of the known methods of preparing boric acid is by agitating and boiling the finely ground naturally occurring borates above referred to, together with diluted sulfuric acid. The mass so obtained is allowed to settle and the clear liquor containing the boric acid after being separated from the deposited calcium sulfate is run into suitable vessels in which the acid crystallizes out and is recovered. At the present time also brine is electrolytically treated for the purpose of obtaining caustic soda and chlorin gas; the latter being largely used for saturating calcium hydrate in order to produce bleaching powder.

According to the present invention the methods of preparing borax as above referred to and that relating to the electrolysis of brine are combined and elaborated so that by means of a particular arrangement of plant, hereinafter described, borax, boric acid, and chlorate of soda may be produced.

The process is described with reference to the accompanying drawings which are merely diagrammatic and for the purpose of assisting the description.

Figure 1:
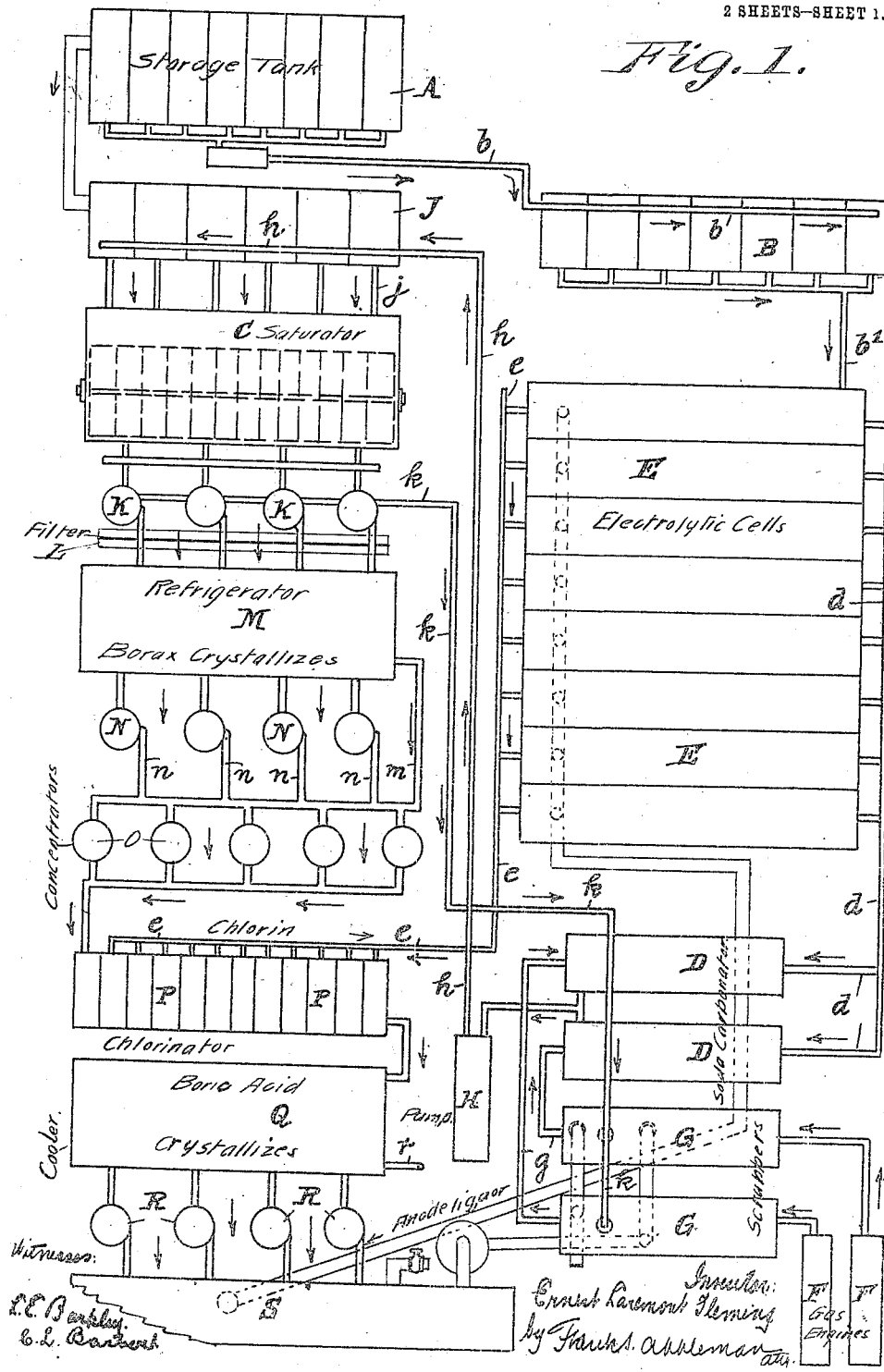
Figure 2:
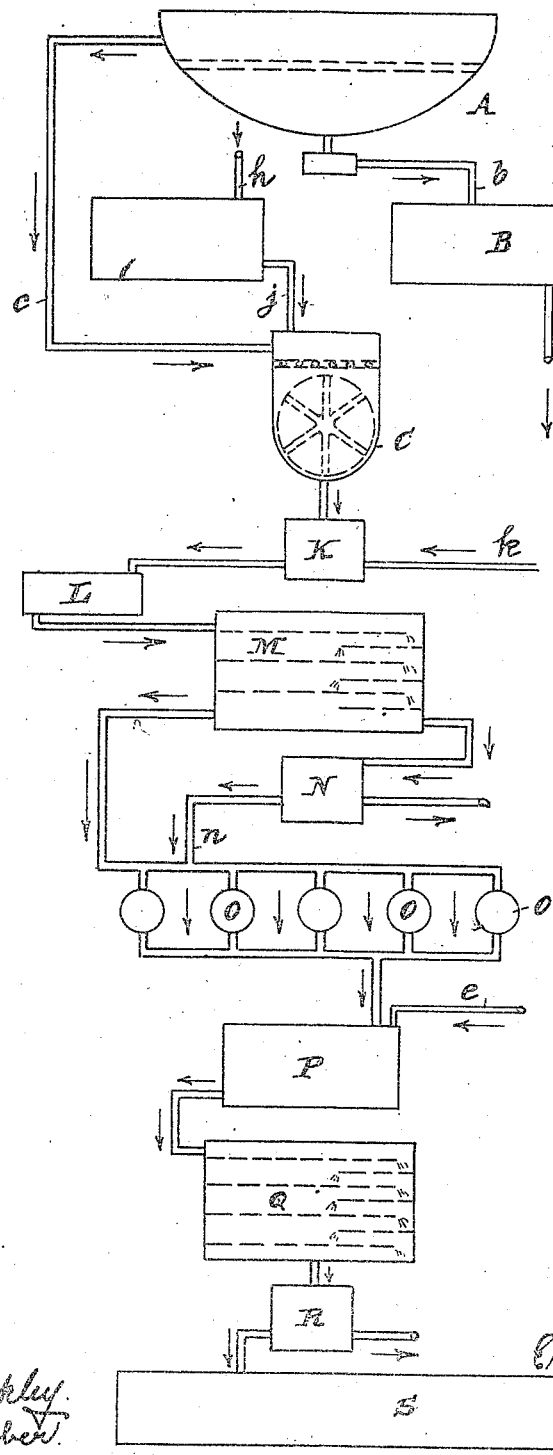

In said drawings Figure 1 represents a side elevation (diagrammatic) of an apparatus suitable for use in carrying out my process, and Fig. 2. represents an end elevation of the same apparatus, the electrolytic cells, the carbonators, and the scrubbers being omitted from this figure in order to avoid confusion.

In carrying out the invention, crude borate of lime, or borate of lime and soda, or a mixture of both these substances, is intimately mixed with brine in a suitable vessel by means of an agitator. The slurry so obtained is then either pumped into settling tanks A and allowed to deposit its sediment, the clear brine being drawn off to vats B by pipes $b$ as required; or it may alternatively be filtered; the object in either case being to recover the brine in a clarified state and to obtain a thoroughly moistened mass of borate material. The borate is passed or conveyed to a decomposing vessel C technically known as a saturator where it is boiled up and thoroughly agitated with the carbonated liquor derived from the carbonators D to be presently described. The clear brine from the settling tanks B, or as otherwise obtained, and preferably containing about 42 ozs. of salt (sodium chlorid) to the gallon, which corresponds to about 33%, is passed on to and decomposed in a series of suitable electrolytic cells E by which means a solution of caustic soda is obtained at the cathode and an equivalent amount of chlorin liberated at the anode. Owing to the solubility of the chlorin in water the anode liquor always contains more or less chlorin in solution. This liquor is therefore utilized for a purpose to be described subsequently and is hereinafter referred to as the "anode liquor." The caustic soda solution obtained at the cathode is transferred by pipes $d$ to the carbonators and there treated for the purpose of carbonating it, with carbon di-oxid gas, which may be obtained in any convenient manner. The exhaust gases from the internal combustion engines F which may form part of the plant may be advantageously utilized for this purpose, in which case the gases are passed through scrubbers G from which, after being mixed with a further supply if desired of carbon di-oxid gas obtained in a manner to be hereinafter described from the calcium carbonate residues separated from the borax liquor, they are sent on directly to the carbonators D by pipes $g$. The carbonating of the caustic soda liquor is carried on until the composition of the carbonate of soda therein produced approximately corresponds to that of the sesquicarbonate when it is transferred by the pump H and pipe $h$ to the vats J and thence by pipes $j$ to the decomposing vessel or saturator C previously referred to. It is here thoroughly mixed, agitated, and boiled up with the moist borate of lime obtained from vessel A as above described, the proportions of borate and carbonated liquor being regulated according to the previously ascertained composition of each, after the manner above described for borax manufacture.

When the reaction between the carbonated soda liquor and the borate material is complete, the whole of the liquor from the decomposing pan C, which holds the borax formed in solution and the calcium carbonate which is simultaneously produced in suspension, is passed through a centrifugal K, by which means the bulk of the calcium carbonate is removed and a liquor obtained which is further clarified by passing it through a filter press L.

The calcium carbonate obtained from this and the preceding treatment in the centrifugal, is taken by means of a conveyer $k$ or in other suitable manner to the exhaust gas scrubbers G where it is treated as hereafter described for the purpose of recovering some of its carbon di-oxid gas. The hot liquor from the filter press L which contains the borax is then passed over a refrigerator M, as a result of which treatment part of the borax crystallizes out and is collected, leaving a remainder in solution, which passes by pipe $m$. Any adhering liquid is removed from the crystallized borax thus obtained and its drying completed by treating it in a hydro extractor N, the liquor from which passes by pipe $n$ and after being mixed with the original mother-liquor from the borax crystals is then concentrated in suitable pans O till its density reaches 60 degrees Twaddell. When of this specific gravity the hot liquor is passed into a chlorinating vessel P where, its temperature being maintained by steam coils or other heat, it is subjected to the action of a current of chlorin gas which as previously described has been produced by the electrolytic decomposition of the original brine and conveyed to the chlorinator by pipes $e$. Decomposition of the borax remaining in solution in the hot liquor takes place under these conditions; the products resulting from its interaction with the chlorin being sodium chlorid, sodium chlorate, and boric acid, all of which are held in solution by the hot liquid. More or less excess of free chlorin will also be found to be dissolved in the liquor at this stage if the chlorinating action has been carried—as it should be—to the point of complete decomposition of the borax. The hot liquor brought from the chlorinator is next passed to a refrigerator Q and cooled, any large excess of free chlorin gas being blown away, such treatment resulting in a copious deposition of crystallized boric acid, which is then separated from its mother-liquor by the action of a centrifugal R. The boric acid is removed by a conveyer $r$, and the residual mother liquor, which upon standing may deposit a further quantity of boric acid crystals is conveyed to the receptacle S. In this spent condition and containing among other substances the sodium chlorate, sodium chlorid and free chlorin previously referred to, it is run into the vat S and may be mixed with the "anode liquor" from the electrolytic cells, and then sent on to the exhaust gas scrubbers G, there to meet and react with the calcium carbonate residues obtained as a by-product of the interaction of the borate material and the carbonated liquors as described in a previous portion of this specification, or the spent liquor may be separately treated. The free chlorin which such liquors contain, at this point reacts with a portion of the calcium carbonate to form calcium chlorid and carbon di-oxid gas which latter goes forward with the exhaust gas to carbonate the caustic soda liquor as previously described.

The calcium chlorid, sodium chlorate, borate of soda, and free boric acid and salt pass into solution in the spent liquor which may be run to waste. If it is desired to recover the sodium chlorate, the liquor is not passed through the scrubbers but is concentrated and cooled, boric acid being deposited by crystallization and recovered. The liquor is then further concentrated and the sodium chlorid combined with a small percentage of boric acid fished out, which forms a very efficient food preservative. After fishing out the salt at a boiling temperature, the liquor containing a saturated solution of sodium chlorate is cooled, and the sodium chlorate crystallized out.

Claim.

A process of producing borax, boric acid and sodium chlorate, which comprises reacting upon a borate of an alkaline earth metal with a solution of a carbonate, separating a fraction of the borax from the resulting solution by crystallization, concentrating the mother liquor still containing borax to produce a hot concentrated solution of borax, treating said hot solution with chlorin gas, and thereafter separately crystallizing boric acid and sodium chlorate from said liquor.

In testimony whereof I affix my signature in presence of two witnesses.

ERNEST LAREMONT FLEMING.

Witnesses:
A. J. DAVIES,
B. E. KNIGHT.